United States Patent
Huffman et al.

(10) Patent No.: US 9,335,967 B1
(45) Date of Patent: May 10, 2016

(54) ACCURATE FLOATING-POINT CALCULATION METHOD AND DEVICE

(71) Applicant: Cadence Design Systems, Inc., San Jose, CA (US)

(72) Inventors: William A. Huffman, Los Gatos, CA (US); David H. C. Chen, Palo Alto, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 303 days.

(21) Appl. No.: 13/917,483

(22) Filed: Jun. 13, 2013

(51) Int. Cl.
*G06F 7/483* (2006.01)

(52) U.S. Cl.
CPC ...................................... *G06F 7/483* (2013.01)

(58) Field of Classification Search
CPC ... G06F 7/5443; G06F 7/483; G06F 7/49936; G06F 2207/3884; G06F 5/012
USPC ......... 708/500, 605, 504, 495, 501, 650, 200, 708/208, 490
See application file for complete search history.

(56) References Cited

U.S. PATENT DOCUMENTS

| | | | |
|---|---|---|---|
| 5,249,149 A * | 9/1993 | Cocanougher et al. | 708/504 |
| 2006/0179092 A1* | 8/2006 | Schmookler | 708/204 |
| 2012/0011182 A1* | 1/2012 | Raafat et al. | 708/205 |

OTHER PUBLICATIONS

Viitanen, Jaaskelainen and Esko; "Simplified floating-point division and square root"; May 26-31, 2013; Acoustics, Speech and Signal Processing (ICASSP), 2013 IEEE International Conference; p. 2707-2711.*

IEEE Computer Society; "IEEE Standard for Floating Point Arithmetic"; Aug. 2008.*

* cited by examiner

*Primary Examiner* — Michael D Yaary
(74) *Attorney, Agent, or Firm* — Sawyer Law Group, P.C.

(57) ABSTRACT

A method is provided to narrow down the exponent range throughout most part of the division and square root calculations, to make both software assistance and precision extension unnecessary. The method adjusts the exponent at the end of the calculation to reach IEEE-754 results.

27 Claims, 13 Drawing Sheets

NEXP01 aN, a;      // Instruction #1

DIV0   y0, b;      // Instruction #2

MOV    ex, b;      // Instruction #3

MKDADJ ex, a;      // Instruction #4

NEXP01 bN, b;      // Instruction #5

CONST  e, #1;      // Instruction #6

MADDN  e, bN, y0;  // Instruction #7

MOV    y, y0;      // Instruction #8

MADDN  y, e, y0;   // Instruction #9

CONST  e, #1;      // Instruction #10

CONST  q, #0;      // Instruction #11

NEG    r, aN;      // Instruction #12

MADDN  e, bN, y;   // Instruction #13

MADDN  q, at, y0;  // Instruction #14

MADDN  y, e, y;    // Instruction #15

MADDN  r, bN, q;   // Instruction #16

CONST  e, #1;      // Instruction #17

MADDN  e, bN, y;   // Instruction #18

MADDN  q, r, y;    // Instruction #19

NEG    r, aN;      // Instruction #20

MADDN  y, e, y;    // Instruction #21

MADDN  r, bN, q;   // Instruction #22

DIVN   q, r, y, ex; // Instruction #23

```
NEXP01  aN, a;       // Instruction #1
DIV0    y0, b;       // Instruction #2
MOV     ex, b;       // Instruction #3
MKDADJ  ex, a;       // Instruction #4
NEXP01  bN, b;       // Instruction #5
CONST   e, #1;       // Instruction #6
MADDN   e, bN, y0;   // Instruction #7
MOV     y, y0;       // Instruction #8
MADDN   y, e, y0;    // Instruction #9
CONST   e, #1;       // Instruction #10
CONST   q, #0;       // Instruction #11
NEG     r, aN;       // Instruction #12
MADDN   e, bN, y;    // Instruction #13
MADDN   q, at, y0;   // Instruction #14
MADDN   y, e, y;     // Instruction #15
MADDN   r, bN, q;    // Instruction #16
CONST   e, #1;       // Instruction #17
MADDN   e, bN, y;    // Instruction #18
MADDN   q, r, y;     // Instruction #19
NEG     r, aN;       // Instruction #20
MADDN   y, e, y;     // Instruction #21
MADDN   r, bN, q;    // Instruction #22
MULN    ry, r, y;    // Instruction #23
DIVN    q, ry, ex;   // Instruction #24
```

FIG. 7

```
NEXP01   aN, a;       // Instruction #1
DIV0     y0, b;       // Instruction #2
MOV      ex, b;       // Instruction #3
MKDADJ   ex, a;       // Instruction #4
NEXP01   bN, b;       // Instruction #5
CONST    e, #1;       // Instruction #6
MADDN    e, bN, y0;   // Instruction #7
MOV      y, y0;       // Instruction #8
MADDN    y, e, y0;    // Instruction #9
CONST    e, #1;       // Instruction #10
CONST    q, #0;       // Instruction #11
NEG      r, aN;       // Instruction #12
MADDN    e, bN, y;    // Instruction #13
MADDN    q, at, y0;   // Instruction #14
MADDN    y, e, y;     // Instruction #15
MADDN    r, bN, q;    // Instruction #16
CONST    e, #1;       // Instruction #17
MADDN    e, bN, y;    // Instruction #18
MADDN    q, r, y;     // Instruction #19
NEG      r, aN;       // Instruction #20
MADDN    y, e, y;     // Instruction #21
MADDN    r, bN, q;    // Instruction #22
ADDEXPM  q, ex;       // Instruction #23
ADDEXP   y, ex;       // Instruction #24
DIVN     q, r, y;     // Instruction #25
```

FIG. 8

```
NEXP01 hN, a;      // Instruction #1
SQRT0  y, a;       // Instruction #2
MKSADJ ex, a;      // Instruction #3
CONST  t1, #0;     // Instruction #4
MADDN  t1, y, y;   // Instruction #5
CONST  t2, #3;     // Instruction #6
ADDEXP hN, t2;     // Instruction #7
MADDN  t2, t1, hN; // Instruction #8
NEXP01 dN, a;      // Instruction #9
NEG    h2, dN;     // Instruction #10
MADDN  y, t2, y;   // Instruction #11
CONST  R, #0;      // Instruction #12
CONST  t5, #0;     // Instruction #13
CONST  H, #0;      // Instruction #14
MADDN  R, h2, y2;  // Instruction #15
MADDN  t5, y2, hN; // Instruction #16
CONST  t6, #3;     // Instruction #17
MADDN  H, t6, y2;  // Instruction #18
MADDN  dN, R, R;   // Instruction #19
MADDN  t6, t5, y2; // Instruction #20
NEG    HN, H;      // Instruction #21
MADDN  R, dN, HN;  // Instruction #22
MADDN  H, t6, H;   // Instruction #23
NEXP01 dN, a;      // Instruction #24
MADDN  dN, R, S;   // Instruction #25
NEG    HN, H;      // Instruction #26
DIVN R, dN, HN, ex;// Instruction #27
```

ACCURATE FLOATING-POINT
CALCULATION METHOD AND DEVICE

FIELD OF THE INVENTION

The present invention relates generally to processing systems and particularly to providing floating point calculations in such systems.

BACKGROUND

It is desired is to provide an accurate division and square root operations in a processing system while minimizing hardware and software. Some conventional methods use software library and end up with slower devices. Other conventional methods extend the precision and end up requiring larger hardware.

Accordingly, what is desired is a system and method for addressing the above-identified issues. The present invention addresses such a need.

SUMMARY

A method and system are provided to narrow down the exponent range throughout most part of the division and square root calculations, to make both software assistance and precision extension unnecessary. The method and system adjusts the exponent at the end of the calculations to reach IEEE-754 industry standard results.

A computer implemented method for providing a floating point operation to provide a quotient is disclosed. The quotient is provided by dividing an original dividend value by an original divisor value. In a first aspect, the computer implemented method comprises obtaining a new dividend by reducing an exponent range of the original dividend value and a new divisor by reducing an exponent range of the original divisor value; and obtaining an approximate reciprocal value of the new divisor value. The method also comprises providing an approximate quotient value and one or more error values based upon the new dividend and the approximate reciprocal value of the new divisor value; and utilizing the original dividend value and the original divisor value to generate an adjustment value. Finally the method comprises utilizing a multiplier/adder to provide an accurate quotient based upon the adjustment value, the one or more error values and the approximate quotient value.

In a second aspect, a computer implemented method for providing a floating point operation for providing a square root of an original number is provided. The computer implemented method comprises obtaining a new number by reducing an exponent range of the original number; and obtaining an approximate value of a reciprocal square root of the new number. The method further includes providing an approximate square root value and one or more error values based the approximate reciprocal square root value of the new number and utilizing the original number to generate an adjustment value. Finally the method comprises utilizing a multiplier/adder to provide an accurate square root of the original number based upon the adjustment value, the one or more error values and the approximate square root value.

BRIEF DESCRIPTION OF THE DRAWINGS

FIG. 1 is an instruction sequence of a first division embodiment in accordance with the present invention.

FIG. 4 is a lookup table for providing an approximate reciprocal value in accordance with the present invention.

FIG. 7 is an instruction sequence of a second division embodiment n accordance with the present invention.

FIG. 8 is an instruction sequence of a third division embodiment in accordance with the present invention.

FIG. 10 is an instruction sequence of a first square root embodiment in accordance with the present invention.

FIG. 12 is a lookup table for providing an approximate reciprocal square root value in accordance with the present invention.

DETAILED DESCRIPTION

Figure 2:
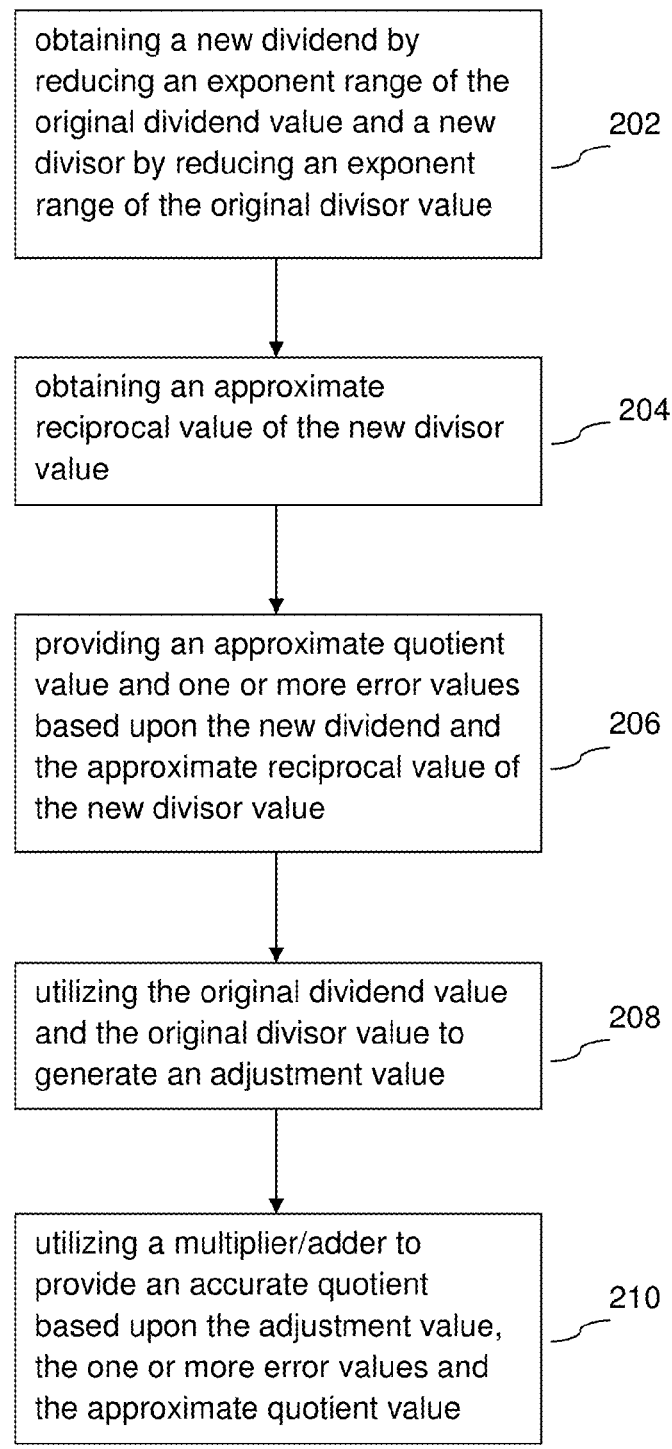
FIG. 2 is a flow chart for providing a quotient utilizing a floating point operation.

The present invention relates generally to processing systems and particularly to providing floating point calculations in such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Methods and systems for performing floating point calculations are disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state register, register file, memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

The methods described herein may also be implemented using any suitable instruction set or instruction set architecture (ISA). The devices described herein may be implemented using an operation hardware, an emulation/simulation software, or a combination thereof. One with ordinary skills in the art understands that described methods or devices are applicable to floating point number calculations, fixed point number calculations, or a combination thereof.

A register or register file may be used to store a floating number or other data type, as an operand, an intermediate value, a final result, or a combination thereof. Any suitable addressing mode and memory architecture may be used to communicate, propagate or transport the operand, intermediate value, or final result.

Floating point numbers may be a native or intrinsic data type in the suitable ISA. A floating point number may be encoded according to IEEE Std 754™, another standard, a proprietary format, or a combination thereof. Throughout this disclosure, "Binary32" binary interchange format of IEEE Std 754™-2008 is used for illustration purposes, though the disclosure anticipates and allows other formats or a combination of formats.

Figure 3:
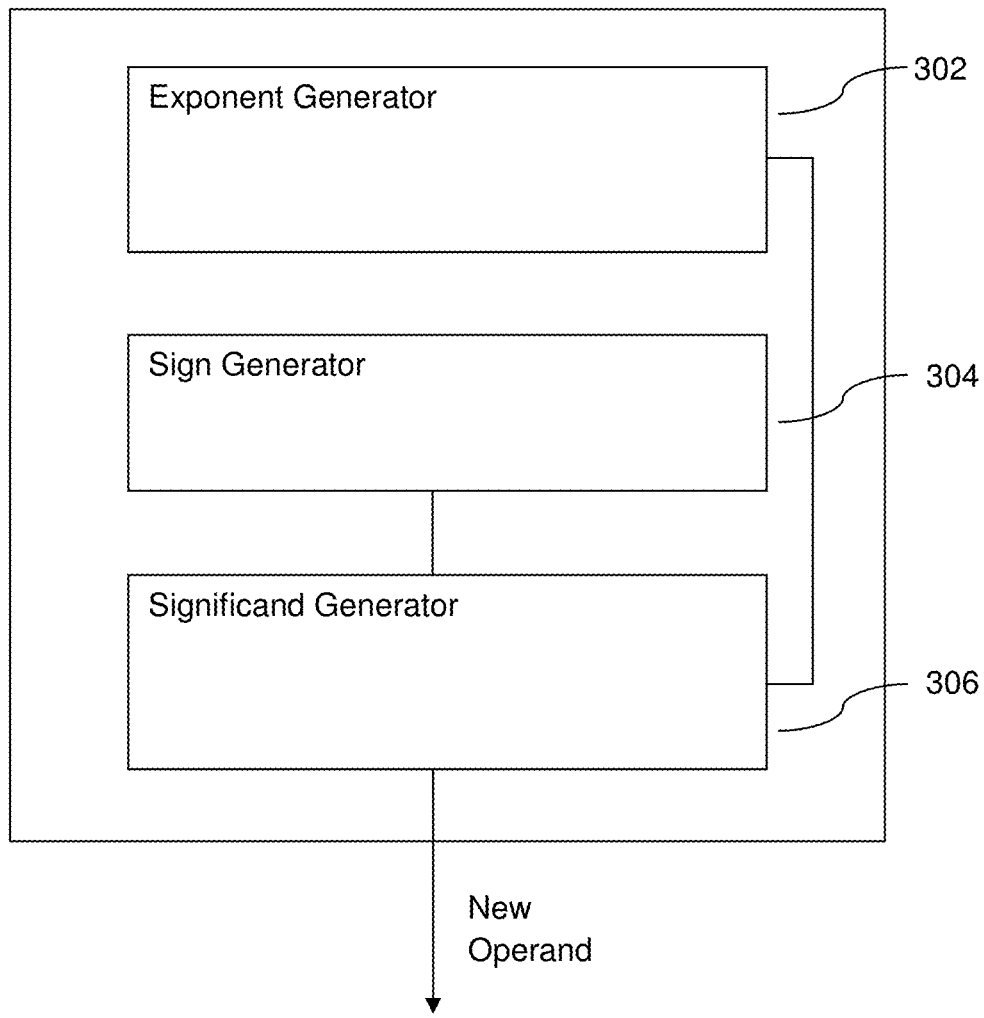
FIG. 3 is a block diagram of a first digital device in accordance with the present invention.

IEEE754 Binary32 uses a sign-magnitude format, with a 1-bit sign (S), an 8-bit biased exponent (E) with bias 127, and a 23 trailing significand field (T) representing the binary digits to the right the binary point, as shown in the FIG. 3.1 of IEEE Std 754™ 2008, and an implicit leading significand bit to the left of the binary point. Thus, the value of a normal number (v) is:

$$v=(-1)^S \times 2^{E-127} \times \text{implicit.trailing}$$

For example, the representation (r) for 1.0 is 0x3F800000, with a sign of 0, biased exponent of 127, a trailing significand of 0, and an implicit leading significand of 1, in Binary32. The representation (r) for Not A Number (NaN) is E=0xFF and T≠0 regardless of S. The representation (r) for positive infinity (−∞) is E=0xFF, T=0 and S=0. The representation (r) for negative infinity (−∞) is E=0xFF, T=0 and S=1. The representation (r) for positive zero is E=0, T=0 and S=0. The representation (r) for negative zero is E=0, T=0 and S=1.

Throughout this disclosure, the term "infinity" or "∞" may represent positive infinity, negative infinity, or both. The term "zero" may represent positive zero, negative zero, or both. The term "significand" may represent the implicit leading significand, the trailing significand, or their combination.

To describe the features of the present disclosure in more detail refer now to the following description in conjunction with the accompanying Figures.

The floating point Division(a,b) operation is to compute a/b. Division(0,0), Division(∞,∞), or Division(a,b) wherein either a or b is NaN may be considered invalid operations as no usefully definable result can be produced. In these cases, a NaN may be produced as the result to signal invalid operations.

The Division(a,b) operation may be implemented using a low gate count and reasonable speed method based on iterative calculations. The method doesn't use many extra gates over or above the fused multiplier/adder which presumably exists. The reasonable speed is achievable by avoiding software library, routine or function to handle the invalid operations or other special conditions. The method also achieves Binary32 accuracy or another predetermined precision by utilizing iterative calculations, such as Newton-Raphson approximations as an example.

The method implements the Division(a,b) operation using a sequence of instructions. Each of the instruction may be implemented as a hardware device or a portion of a hardware device. Instruction hardware may read one or more operands from a register, a register file, a memory, or a combination thereof. The instruction hardware may write one or more results to a register, a register file, a memory, or a combination thereof; such that a following instruction in the sequence may continue any remaining portion of the operation. The last instruction of the sequence may write the Division(a,b) result, which may be a quotient or a NaN, to a register, a register file, a memory, or a combination thereof.

FIG. 1 illustrates an embodiment of a first Division(a,b) instruction sequence.

FIG. 2 is a flow chart for providing a quotient utilizing a floating point operation in accordance with an embodiment. The flow chart implements a Division(a,b) Sequence by obtaining a new dividend and a new divisor, obtaining an approximate reciprocal value of the new divisor, providing an approximate quotient value and at least one error, generating an adjustment based on the original dividend and the original divisor, and utilizing a multiplier/adder to provide an accurate quotient.

In an embodiment, a new dividend is obtained by reducing an exponent range of the original dividend value and a new divisor is obtained by reducing an exponent range of the original divisor value, via step 202 and an approximate reciprocal value of the new divisor value is obtained, via step 204. Thereafter, an approximate quotient value and one or more error values based upon the new dividend and the approximate reciprocal value of the new divisor value is provided via step 206. The original dividend value and the original divisor value are then utilized to generate an adjustment value via step 208. Finally a multiplier/adder is utilized to provide an accurate quotient based upon the adjustment value, the one or more error values and the approximate quotient value via step 210.

An embodiment implements the above described steps with instruction hardware, stores a sequence of instructions in a memory, and allows the instructions to be ordered in various ways in order to maximize an execution speed.

A system and method in accordance with an embodiment anticipates different orders of steps in and for each described method, and breaking down a step into multiple sub-steps wherein the sub-steps of the steps may interleave with each other in various ways.

The obtaining a new dividend and a new divisor may be achieved by reducing or narrowing an exponent range of the original dividend and the original divisor. An embodiment considers the original dividend and the original divisor as original operands, and utilizes a digital device to generate new operands comprising a sign, an exponent, and a significand.

FIG. 3 illustrates an embodiment of a first digital device NEXP01 300 comprising a first element 302 for generating the exponent of the new operand. NEXP01 also comprises a second element 304 for generating the sign of the new operand and by copying or negating the sign of the original operand. NEXP01 further comprises a third element 306 to generate the significand by copying the significand of the original operand. NEXP01 may be used to produce either the new dividend or the new divisor.

The first element 302 of NEXP01 generate the exponent of the new operand by reducing the exponent range of the original operand so that it is numerically in the range of [1.0, 4.0) or (−4.0, −1.0].

By reducing the exponent range of both the dividend and the divisor, the division will be computed with the narrowed exponent range and with fully accurate significands, to avoid underflow or overflow an exponent range of for example Binary32 during intermediate calculation. As intermediate exponent underflows and overflows are avoided, extended precision hardware becomes unnecessary and the embodiment achieves a smaller hardware.

If the original operand is a subnormal or denormalized number, having an implicit leading significand bit of 0, NEXP01 300 may utilize a fourth element (not shown) to normalize the original operand and to generate a normalized operand. The normalized operand, instead of the original operand, is used by the first element and the third element of NEXP01 300. NEXP01 300 is used as Instruction #1 to produce aN from a, the dividend. Instruction #5 used NEXP01 300 again, this time, to produce bN from b, the divisor.

NEXP01 300 may further include a fifth element (not shown) to generate an optional predicate based upon whether the original operand is zero, infinity, NaN, or a predetermined value (such as a subnormal). The optional predicate may represent a false value, when the original dividend is zero, infinity, NaN or a predetermined value, when the original divisor is zero, infinity, NaN or a predetermined value. The false predicate value may be used to skip any unfinished activities of obtaining a dividend and a new divisor, obtaining an approximate reciprocal value, or providing an approximate quotient value and one or more error values.

The obtaining an approximate reciprocal value of the new divisor may be achieved by looking up at least one lookup table. An embodiment implements a hardware element for generating a new operand by utilizing an exponent, a significand, or a combination thereof as an index to a lookup table. The hardware element is incorporated as a sixth element (not shown), using the exponent generated by the first element, the significand generated by the third element, or a combination thereof as the index.

An embodiment of such device with the sixth element (not shown) is called DIV0. According to the index, the lookup table generates an output. The output is an approximate reciprocal value of the new divisor. DIV0 provides the approximate reciprocal value of the new divisor as the new operand. In FIG. 1, DIV0 is used as Instruction #2 to provide the approximate reciprocal value of the new divisor.

Figure 4:
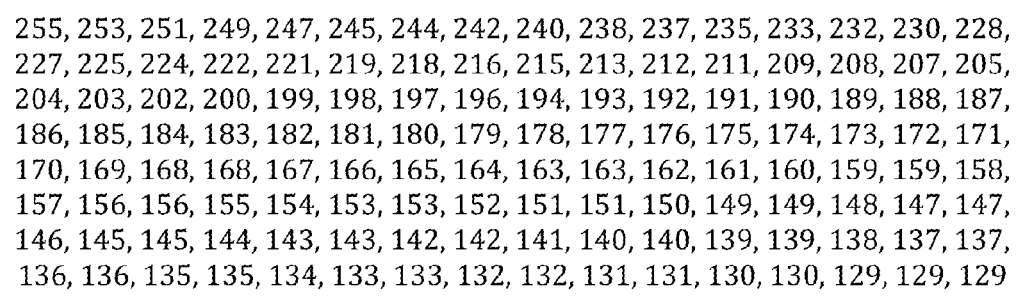

FIG. 4 illustrates an embodiment of the lookup table for generating an approximate reciprocal value. The row in the table is determined by a first three trailing significand bits in the new divisor. Which entry in the row is determined by a next four significand bits. The decimal numbers in the table are converted to 8-bit values, which determine a first eight bits of the approximate reciprocal, including an implicit significand bit.

Providing an approximate quotient value and at least one error may be achieved by utilizing the new dividend, the approximate reciprocal value of the new divisor value. Based on the new dividend, the approximate reciprocal value of the new divisor value, the embodiment provides an approximate quotient value and at least one or values by utilizing iterative calculations such as Newton-Raphson approximations, to achieve a predetermined precision such as Binary32. In FIG. 1, Instruction #6 to Instruction #22 utilize the new dividend aN and the approximate reciprocal value y0 to provide an approximate quotient value q and two errors (r and y).

Generating an adjustment based on the original dividend and the original divisor may be achieved by utilizing the original dividend value and the original divisor value to generate an adjustment value. The embodiment implements an instruction hardware such as a digital device with elements similar to some of the elements of NEXP01 300. With the similar elements, the instruction hardware digital device is able to calculate or anticipate a difference between the original dividend and the new dividend and a difference between the original divisor and the new divisor as generated by NEXP01 300.

Figure 5:
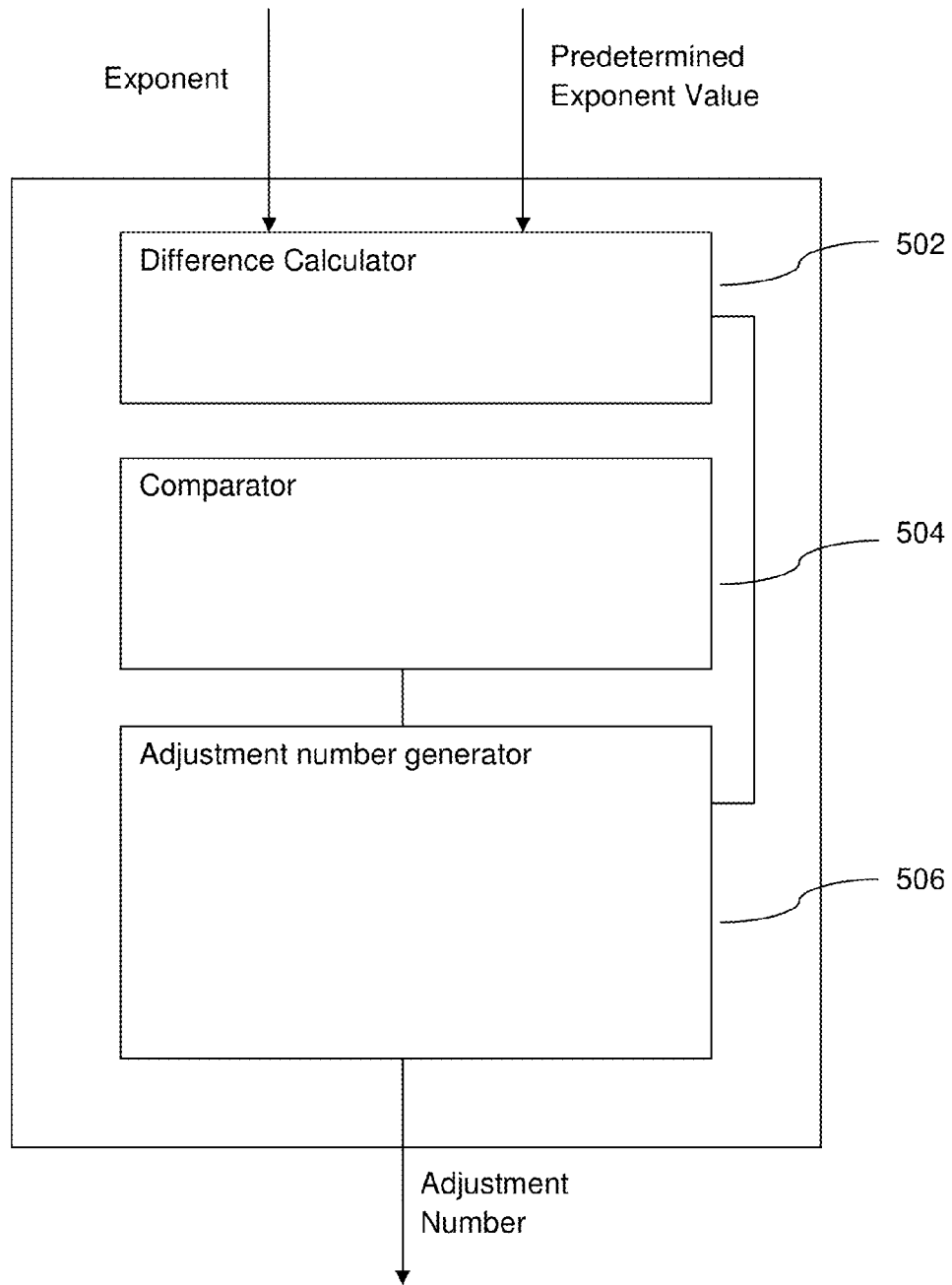
FIG. 5 is a block diagram of a second digital device in accordance with the present invention.

FIG. 5 illustrates an embodiment of a second digital device (MKDADJ) 500. MKDADJ 500 generates the adjustment number based on at least one original operand. In this case, there are two original operands—one is the original dividend, and the other is the original divisor. MKDADJ 500 comprises a first element 502 to calculate at least one difference between at least one exponent of the at least one operand and at least one predetermined exponent value. MKDADJ 500 also comprises a second element 504 to generate at least one comparison result by comparing the least one original operand to infinity, NaN, or a predetermined value (such as a subnormal). MKDADJ 500 further comprises a third element 506 to generate the adjustment number based on the at least one difference calculated by the first element, at least one predetermined adjustment numbers, the at least one comparison result generated by the second element.

MKDADJ 500 may generate at least one special adjustment value when either the original dividend or the original divisor is NaN or upon other special conditions.

Like NEXP01 300, MKDADJ 500 may generate an optional predicate value based on the at least one comparison result generated by the second element. A false predicate value may be used to skip some unfinished executions, in order to maximize an execution speed when invalid operations or other special conditions occur.

Again like NEXP01 300, MKDADJ 500 may further include a fourth element (not shown) to generate at least one normalized operand by normalizing the at least one original operand. In this case, the first element 502 utilizes the at least one normalized operand instead of the at least one original operand. In FIG. 1, the original divisor b is copied to a first operand of Instruction #3 (ex) first, then MKDADJ 500 (Instruction #4) considers both the original divisor (now also stored in ex) and the original dividend a to generate an adjustment value. MKDADJ 500 stores the adjustment value to ex.

Utilizing a multiplier/adder to provide an accurate quotient may be achieved by basing the new quotient upon the adjustment value, the one or more error values and the approximate quotient value. The embodiment utilizes a digital device capable of multiplying, adding and fused multiplying-adding at least one operand to provide the accurate quotient.

Figure 6:
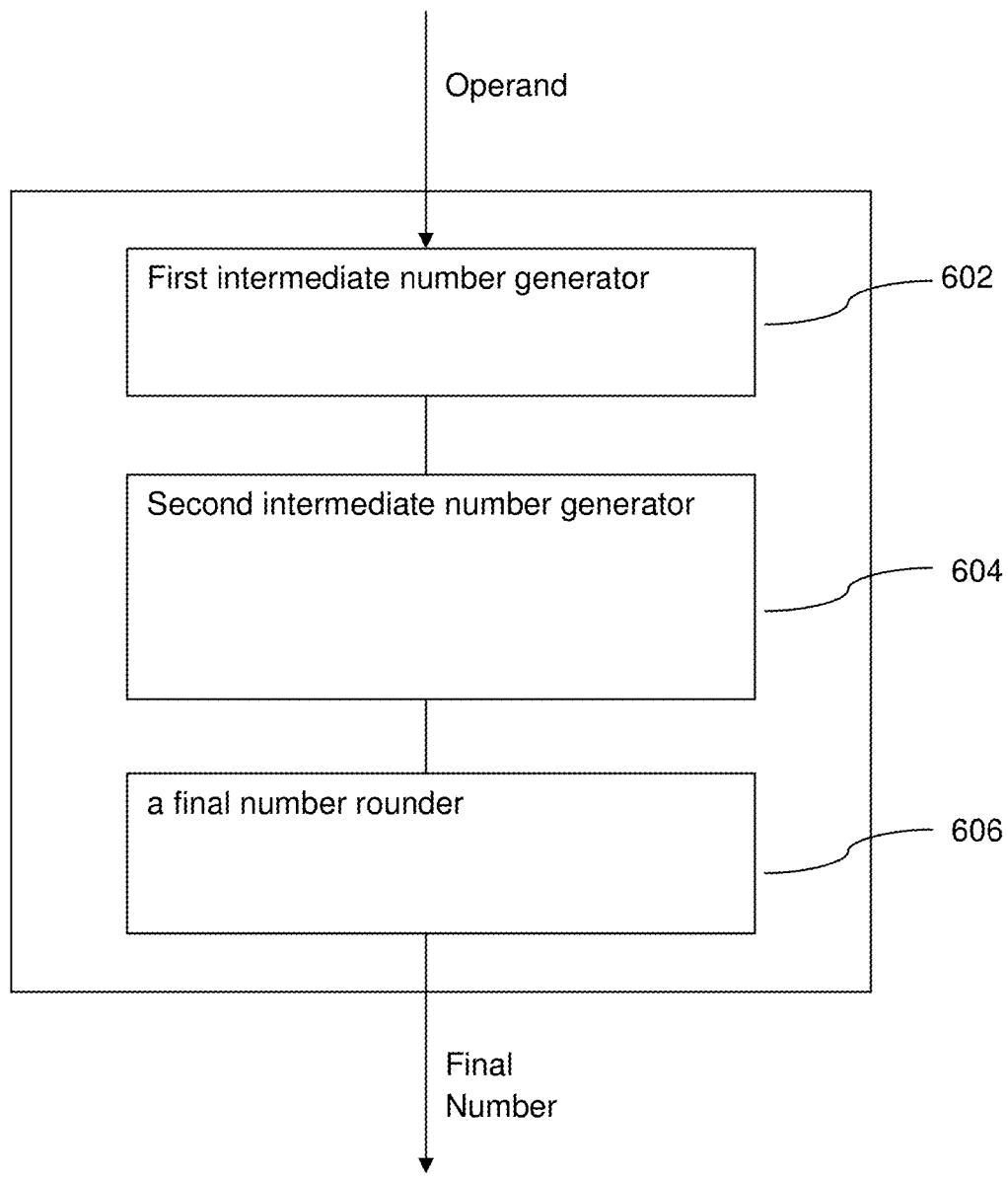
FIG. 6 is a block diagram of a third digital device in accordance with the present invention.

FIG. 6 illustrates an embodiment of a third digital device DIVN. DIVN comprises a first element 602 to generate a first intermediate number based upon the at least one operand. In this case, there are three operands—one is the approximate quotient value; the other two are two error values. The first element 602 generates the first intermediate value by fused multiplying-adding the three operands.

DIVN 600 also comprises a second element 604 to generate a second intermediate number by adjusting an exponent of the first intermediate number upon the adjustment number, to account for the exponents of the original dividend and the original divisor. DIVN 600 further comprises a third element 606 to generate a final number by rounding the second intermediate number.

The final number is the accurate quotient output from the division sequence in the embodiment. The third element 606 may generate NaN, zero or infinity as the final number when the adjustment number is a predetermined special adjustment value.

As MKDADJ 500 is capable of generating special adjustment values under special conditions and DIVN 600 is capable of generating NaN, zero or infinity as the accurate quotient output of the Division Sequence. The embodiment may handle special conditions without software library or other forms of software assistance. Without calling any software, the embodiment is able to produce accurate quotients in a faster speed. In FIG. 1, Instruction #23 uses DIVN 600 to generate the accurate quotient based on the approximate quotient q, two errors r and y, and the adjustment value ex.

FIG. 7 illustrates an embodiment of a second Division(a,b) instruction sequence. The second Division(a,b) instruction sequence shares the same Instruction #1 to Instruction #22 as the first Division(a,b) instruction sequence (FIG. 1). In FIG. 7, MULN is used as Instruction #23 to multiply r and y and to produce a product ry. In FIG. 7, Instruction #24 uses a second embodiment of DIVN, which takes only one error ry, to generate the accurate quotient based on the approximate quotient q, the error ry, and the adjustment value ex.

FIG. 8 illustrates an embodiment of a third Division(a,b) instruction sequence, which utilizes encoding and decoding. The third Division(a,b) instruction sequence shares the same Instruction #1 to Instruction #22 as the first Division(a,b) instruction sequence (FIG. 1). In FIG. 8, ADDEXPM and ADDEXP are used as Instruction #23 and Instruction #24 respectively. ADDEXPM and ADDEXP may be implemented as a digital device to encode a first half and a second half of the adjustment value ex into the approximate quotient q, and an error y, respectively. In FIG. 8, Instruction #25 uses a third embodiment of DIVN, which decodes the adjustment value from q and y, and utilizes the decoded adjustment value. The third embodiment of DIVN utilizes one less operand by being able to decode the adjustment value from other operands.

Figure 9:
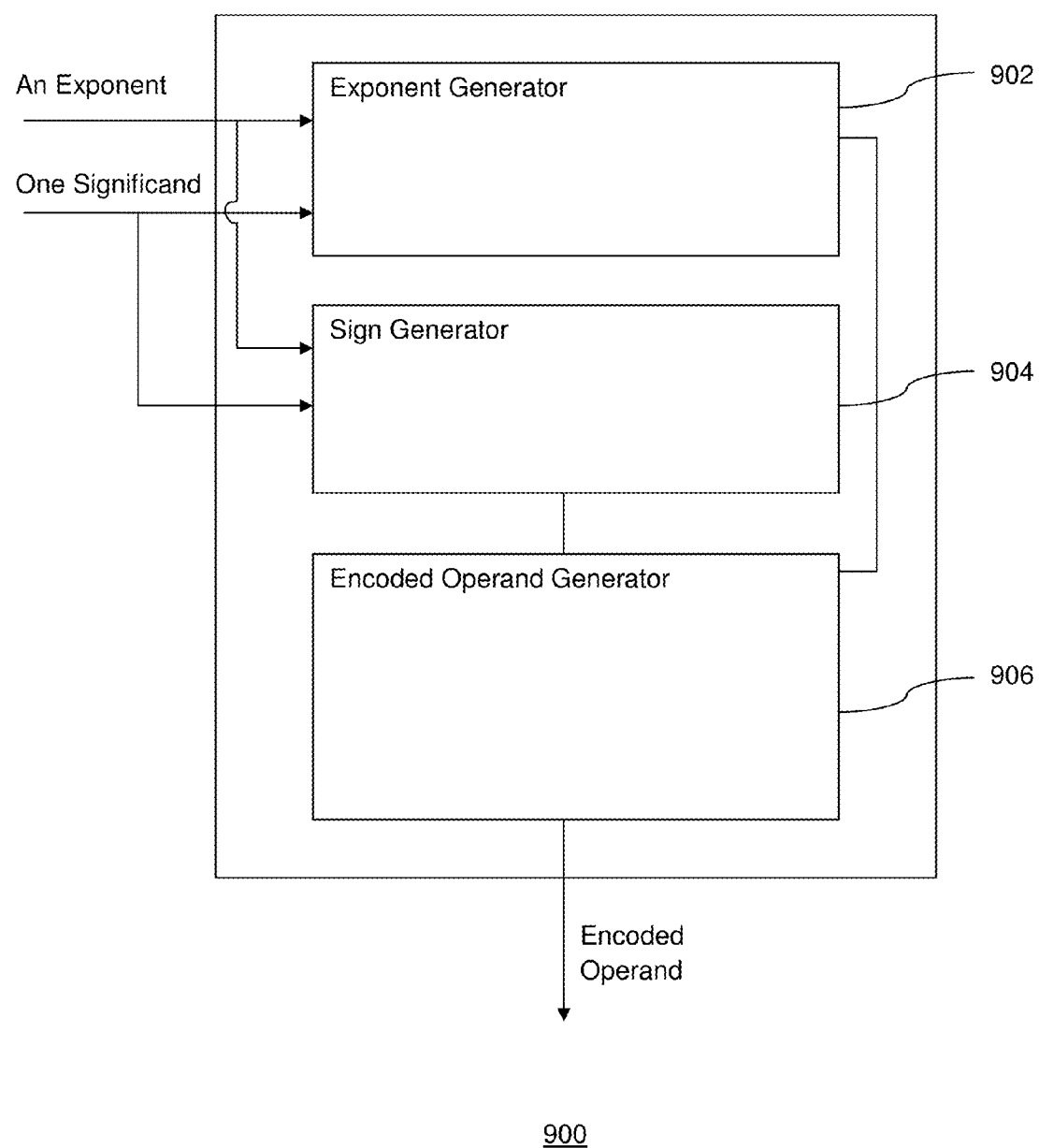
FIG. 9 is a block diagram of a fourth digital device in accordance with the present invention.

FIG. 9 illustrates an embodiment of a fourth device ADDEXP 900. ADDEXP 900 comprises a first element 902 to generate an exponent based on at least one exponent of the at least one original operand, at least one significand of the at least one original operand, or a combination thereof. In this case, there are two original operands—one is the original approximate quotient q; the other is the adjustment value ex. The first element 902 generates the exponent based on an exponent of q, and a significand of ex. ADDEXP 900 also comprises a second element 904 to generate a sign based on at least one sign of the least one original operand, at least one significand of the at least one original operand, or a combination thereof. In this case. The second element 904 generates the sign based on a sign of q and a significand bit of ex. ADDEXP 900 further comprises a third element 906 to generate the encoded operand based on the exponent generated by the first element 902, the sign generated by the second element 904, at least one original significand of the at least one original operand, or a combination thereof. In this case, the third element 906 generates the encoded approximate quotient by combining the exponent from the first element, the sign from the second element, and an original significand of q.

FIG. 10 illustrates an embodiment of a first Square Root(a) instruction sequence.

Figure 11:
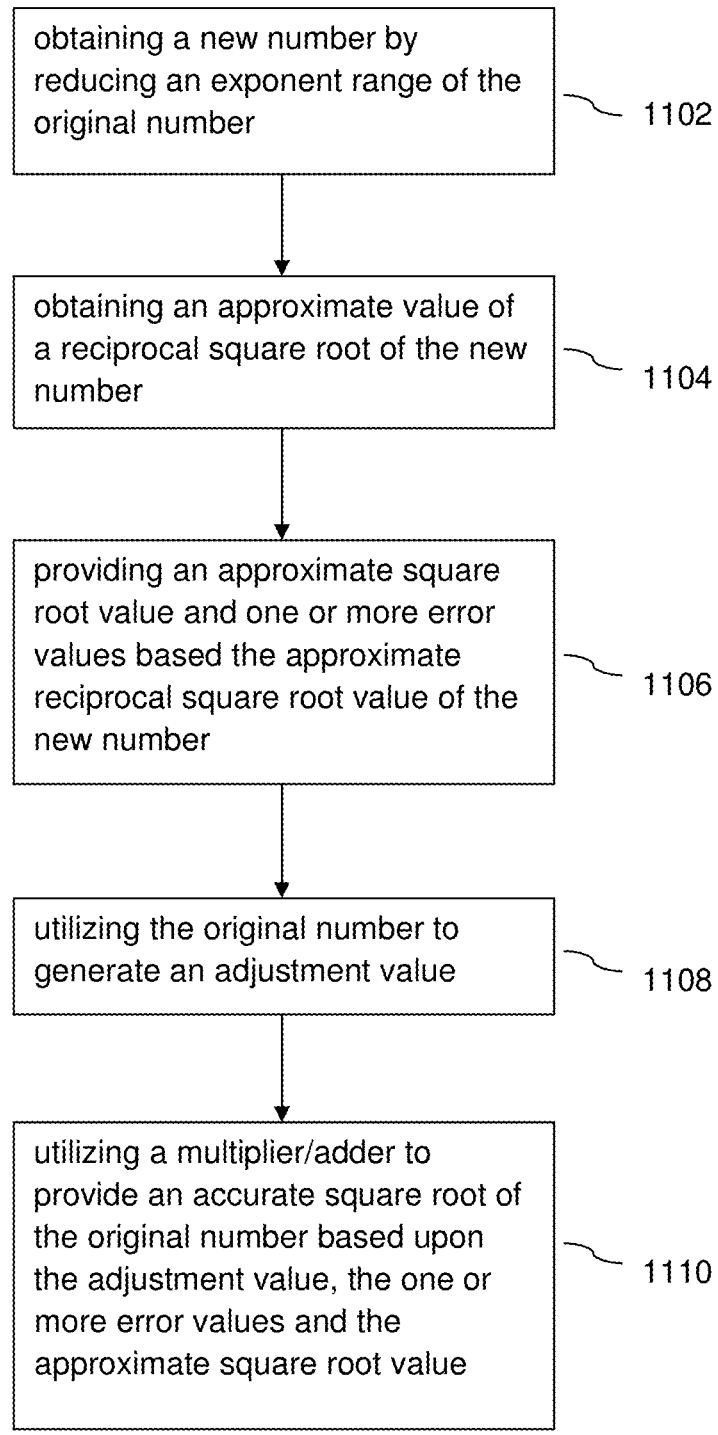
FIG. 11 is a flow chart for providing a square root of an original number utilizing a floating point operation.

FIG. 11 is a flow chart for providing a square root utilizing a floating point operation in accordance with an embodiment. The flow chart implements a Square Root(a) Sequence by obtaining a new number via step 1102, obtaining an approximate reciprocal square root of the new number via step 1104, providing an approximate square root value and at least one error via step 1106, generating an adjustment via step 1108, and utilizing a multiplier/add to provide an accurate square root via step 1110.

Like the first Division(a,b) Sequence (FIG. 1), The Square Root(a) Sequence (FIG. 10) utilizes NEXP01 300 as Instruction #1 to obtain a new number hN. NEXP01 300 may be capable of normalizing the original number.

The obtaining an approximate reciprocal square root of a new number may be achieved by looking up at least one lookup table. An embodiment implements a hardware element for generating the approximate reciprocal square root by utilizing an exponent, a significand, or a combination thereof as an index to a lookup table. The hardware is incorporated as a sixth element (not shown) onto an embodiment of NEXP01 300. An embodiment of such device with the sixth element (not shown) is called SQRT0. As DIV0 (FIG. 1) generates an approximate reciprocal value, SQRT0 (FIG. 10) generates an approximate reciprocal square root value. In FIG. 10, SQRT0 is used as Instruction #2 to provide the approximate reciprocal square root y.

Figure 12:
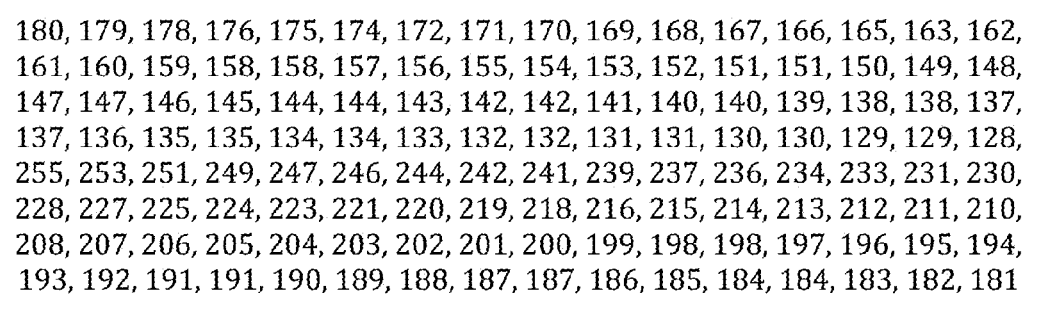

FIG. 12 illustrates an embodiment of the lookup table for generating an approximate reciprocal square root. The row in the table is determined by a low bit of a biased exponent of the new number concatenated with a first two trailing significand bits of the new number. Which entry in the row is determined by a next four significand bits. The decimal numbers in the table are converted to 8-bit values, which determine a first eight bits of the reciprocal square root approximation, including an implicit significand bit.

The providing an approximate square root value and at least one error may be achieved by utilizing the approximate reciprocal square root value. Like the Division(a,b) Sequence (FIG. 1), Square Root(a) Sequence (FIG. 10) utilizes Newton-Raphson approximations to achieve Binary32 precision. In FIG. 10 Instruction #4 to Instruction #26 utilize the approximate reciprocal square root y to provide an approximate square root value R and two errors (dN and HN).

The generating an adjustment based on the original number may be achieved by utilizing the original number to generate an adjustment value. An embodiment implements the second digital device for Square Root(a) Sequence as MKSADJ (not shown). Similar to MKDADJ 500, MKSADJ (not shown) generates the adjustment number based on at least one original operand. In this case, there is one original operand—the original number. Like MKDADJ 500, MKSADJ (not shown) may generate a special adjustment value if the original number is zero, infinity or NaN. Also like MKDADJ 500, MKSADJ (not shown) may generate an adjustment value by calculating or anticipating a difference between the original number and the new number. Furthermore, MKSADJ (not shown) may generate an optional predicate value. A false predicate value may be used to skip some unfinished executions, in order to maximize an execution speed when invalid or other special conditions occur.

The utilizing a multiplier/adder to provide an accurate square root may be achieved by basing the new square root upon the adjustment value, the one or more or values and the approximate square root value. Like Division(a,b) instruction sequence, the Square Root(a) instruction sequence utilizes DIVN as the multiplier/adder. Again like Division(a,b) instruction sequence, an embodiment of a second Square Root(a) instruction sequence may utilize encoding and decoding, by utilizing ADDEXPM, ADDEXP or a combination thereof.

As shown with the above examples, the Division(a,b) instruction sequences can be readily modified and become Square Root(a) instruction sequences, by replacing a lookup table for reciprocal with a lookup table for reciprocal square root, by modifying the second digital device from MKDADJ to MKSADJ to account for a different number of operands, and by selecting a suitable iterative calculation. Similar modifications are anticipated to alter disclosed methods, flows, devices or sequences for calculations of reciprocal, reciprocal square root, sine or other trigonometric functions, arcsine or other cyclometric functions, and more. Additionally, Lookup tables may have more or less numbers of entries, the entries of the lookup tables may have a wider or narrower width, and values of the entries may vary.

Advantages

The advantages are faster calculations and smaller hardware, and still achieving the same accuracy as specified by IEEE-754 standards.

System Overview

The advantages of faster calculations, smaller hardware and same accuracy may enable a low power always on voice or gesture recognition application.

Figure 13:
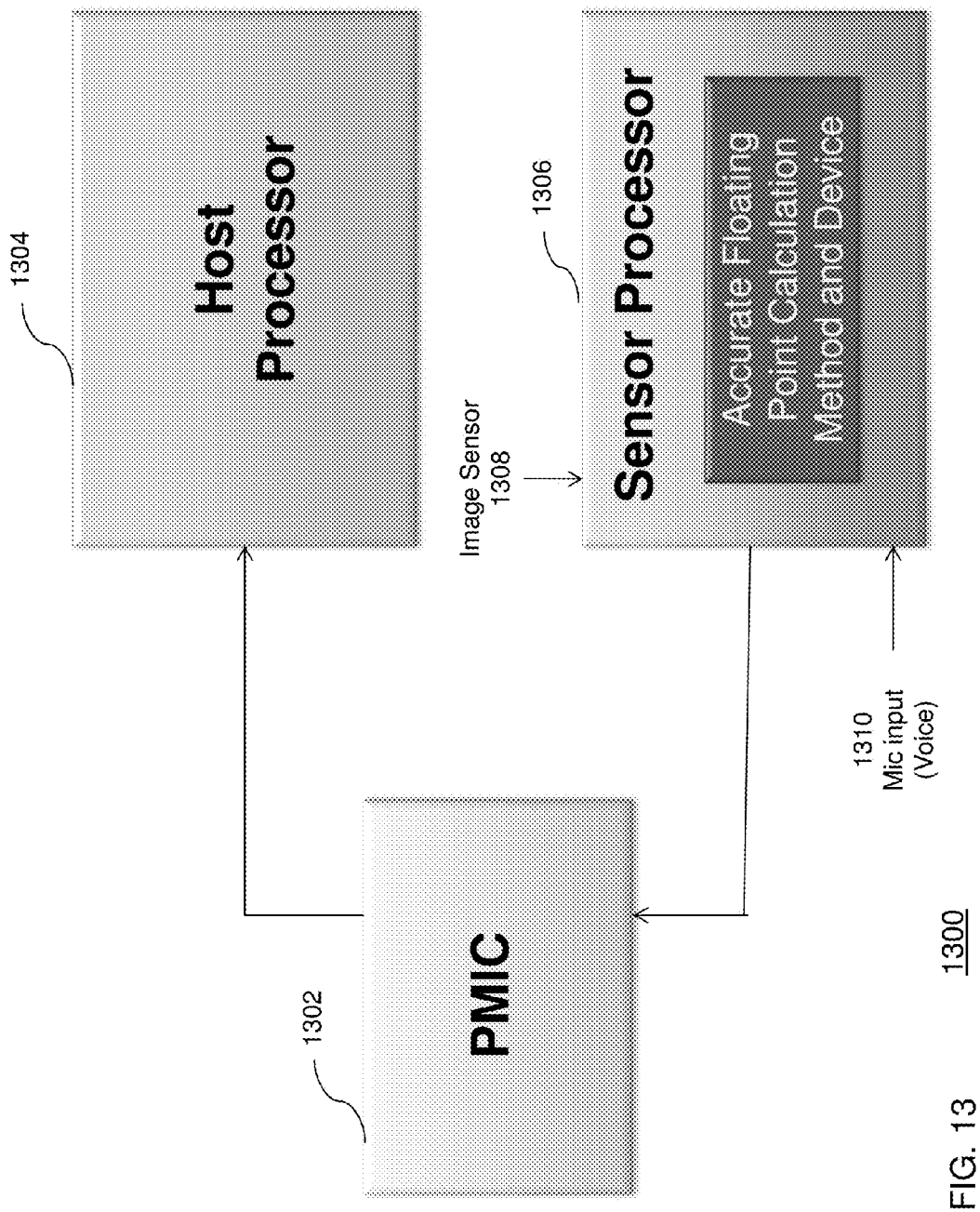
FIG. 13 is a block diagram of a low power always on voice and gesture recognition application.

FIG. 13 illustrates an example use case of the voice or gesture recognition application 1300. The sensor processor 1306 is supplied with an always on power, in order to detect a wake up command by a user. Recognition of the wake up command, such as a verbal password or a predetermined gesture, may result in the sensor processor 1306 signaling a power management integrity circuit (PMIC) 1302 to power on a host processor. Utilizing the disclosed methods and devices, the sensor processor 1306 consumes less active power by performing voice/gesture recognition with a short execution time and consumes less leakage power by having smaller hardware.

A microphone input 1310 may capture the verbal password. An image sensor 1308 may capture the predetermined gesture. The password or the gesture may be pre-filtered in an analog way and then converted into a digital signal in a floating point format. A series of floating point numbers happens as the user speaks or gesticulates. The sensor processor 1306 may apply Viterbi algorithm on the series of floating point numbers for recognizing the wake up command.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for providing a floating point operation; wherein a quotient is provided by dividing an original dividend value by an original divisor value, the computer implemented method comprises:
   obtaining utilizing a first hardware element a new dividend by reducing an exponent range of the original dividend value and a new divisor by reducing an exponent range of the original divisor value;
   obtaining utilizing a second hardware element an approximate reciprocal value of the new divisor value;
   providing an approximate quotient value and one or more error values based upon the new dividend and the approximate reciprocal value of the new divisor value;
   utilizing the original dividend value and the original divisor value to generate an adjustment value by a third hardware element; and
   utilizing a fourth hardware element to provide an accurate quotient based upon the one or more error values and the approximate quotient value.

2. The method of claim 1, wherein providing the approximate quotient value and the one or more error values comprises utilizing iterative calculations to achieve a predetermined precision.

3. The method of claim 1, includes encoding the adjustment value into the approximate quotient, the one or more errors, any other value used in computing the accurate quotient, or a combination thereof and decoding the adjustment value; wherein the fourth hardware element also utilizes the decoded adjustment value to provide the accurate quotient.

4. The method of claim 1, wherein obtaining an approximate reciprocal value comprises looking up at least one lookup table.

5. The method of claim 1, wherein obtaining the new dividend and the new divisor further includes normalizing the original dividend and the original divisor.

6. The method of claim 1, wherein generating the adjustment value based upon whether the original dividend is zero, infinity or not a number (NaN), or whether the original divisor is zero, infinity or not a number (NaN), or a combination thereof.

7. The method of claim 1, wherein generating the adjustment value based upon an anticipated difference between the original dividend and the new dividend or an anticipated difference between the original divisor and the new divisor, or a combination thereof.

8. The method of claim 1, includes generating a false predicate value based upon whether the original dividend is zero, infinity, not a number (NaN), or a predetermined value, whether the original divisor is zero, infinity, not a number (NaN), or a predetermined value, or a combination thereof; wherein obtaining a new dividend and a new divisor, obtaining an approximate reciprocal value, or providing an approximate quotient value and one or more error values is skipped when the predicate value is false.

9. A computer implemented method for providing a binary floating point operation; wherein a square root of an original number is provided, the computer implemented method comprises:
   obtaining utilizing a first hardware element a new binary number by reducing an exponent range of the original number;
   obtaining utilizing a second hardware element an approximate value of a reciprocal square root of the new binary number;
   providing an approximate square root value and one or more error values based the approximate reciprocal square root value of the new binary number;
   utilizing the original number to generate an adjustment value by a third hardware element; and
   utilizing a fourth hardware element to provide an accurate square root of the original number based upon the one or more error values and the approximate square root value.

10. The method of claim 9, wherein providing the approximate square root and the one or more error values comprises utilizing iterative calculations to achieve a predetermined precision.

11. The method of claim 9, includes encoding the adjustment value into the approximate square root, the one or more errors, any other value used in computing the accurate square root, or a combination thereof and decoding the adjustment value; wherein the fourth hardware element also utilizes the decoded adjustment value to provide the accurate square root.

12. The method of claim 9, wherein obtaining an approximate reciprocal square root value comprises looking up at least one lookup table.

13. The method of claim 9, wherein obtaining the new number further includes normalizing the original number.

14. The method of claim 9, wherein generating the adjustment value based upon whether the original number is zero, infinity or not a number (NaN.

15. The method of claim 9, wherein generating the adjustment value based upon an anticipated difference between the original number and the new number.

16. The method of claim 9, includes generating a false predicate value based upon whether the original number is zero, infinity, not a number (NaN), or a predetermined value; wherein obtaining a new number, obtaining an approximate reciprocal square root value, or providing an approximate square root value and one or more error values is skipped when the predicate value is false.

17. A digital device for executing a floating point instruction comprises:
   a first hardware element for generating a first intermediate number based upon at least one operand;
   a second hardware element coupled to the first hardware element for generating a second intermediate number by adjusting an exponent of the first intermediate number upon an adjustment number; and
   a third hardware element coupled to the second hardware element for generating a final number by rounding the second intermediate number, wherein the final number is a result of the floating point instruction.

18. The device of claim 17, includes a fourth element for decoding the adjustment number from the at least one operand to provide a decoded adjustment number; wherein the second element utilizes the decoded adjustment number to generate the second intermediate number.

19. The device of claim 17, wherein the third element generates zero, infinity or not a number (NaN) as the final number when the adjustment number matches certain predetermined numbers.

20. A digital device for executing a floating point instruction comprises:
   a first hardware element for calculating at least one difference between at least one exponent of the at least one original operand and at least one predetermined exponent value;
   a second hardware element for generating at least one comparison result by comparing the least one original operand to infinity, not a number (NaN), or a predetermined number; and
   a third hardware element coupled to the first and the second elements for generating the adjustment number based on the at least one difference calculated by the first element, at least one predetermined adjustment number, the at least one comparison result generated by the second element, or a combination thereof.

21. The device of claim 20, wherein a predicate value is also generated based on the at least one comparison result generated by the second hardware element.

22. The device of claim 20, includes a fourth element coupled to the first element for generating at least one normalized operand by normalizing the at least one original operand; wherein the first element utilizes the at least one normalized operand instead of the at least one original operand.

23. A digital device for generating a new operand based on an original operand, wherein the original operand comprises a sign, an exponent and a significand comprises:
   a first hardware element for generating an exponent by narrowing the exponent range of the original operand;
   a second hardware element for generating a sign by copying or negating the sign of the original operand; and
   a third hardware element coupled to the first and the second elements for generating a significand by copying the significand of the original operand.

24. The device of claim 23, includes a fourth element coupled to the first and third elements for generating a predicate based upon whether the original operand is zero, infinity, not a number (NaN), or a predetermined value.

25. The device of claim 23 includes a fifth element coupled to the first and third elements for generating a normalized operand by normalizing the original operand; wherein the first element and the third element utilize the normalized operand instead of the original operand.

26. The device of claim 23, includes a sixth element coupled to the first and third elements for generating the new operand by utilizing the exponent generated by the first element or the significand generated by the third element, or a combination thereof as an index to a lookup table; wherein the new operand generated by the device is from an output of the lookup table instead of from a composition of the exponent, sign and significand generated by the first, second and third elements.

27. A digital device for executing a floating point instruction comprises:
   a first hardware element for generating an exponent based on at least one exponent of the at least one original operand or at least one significand of the at least one original operand, or a combination thereof;
   a second hardware element for generating a sign based on at least one sign of the least one original operand or at least one significand of the at least one original operand, or a combination thereof; and
   a third hardware element coupled to the first and the second elements for generating the encoded operand based on the exponent generated by the first element, the sign generated by the second element, at least one significand of the at least one original operand, or a combination thereof.

* * * * *